(12) United States Patent
Gruhl et al.

(10) Patent No.: US 10,887,267 B2
(45) Date of Patent: Jan. 5, 2021

(54) INTELLIGENT NOTIFICATION ROUTING AND DELIVERY

(71) Applicant: International Business Machines Corporation, Armonk, NY (US)

(72) Inventors: Daniel Gruhl, San Jose, CA (US);
Chris Kau, Mountain View, CA (US);
Linda Kato, San Jose, CA (US);
Alfredo Alba, Morgan Hill, CA (US);
Chad DeLuca, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/128,747

(22) Filed: Sep. 12, 2018

(65) Prior Publication Data

US 2020/0084171 A1    Mar. 12, 2020

(51) Int. Cl.
*G06F 15/16* (2006.01)
*H04L 12/58* (2006.01)
*G06N 5/02* (2006.01)

(52) U.S. Cl.
CPC ............ *H04L 51/24* (2013.01); *G06N 5/022* (2013.01); *H04L 51/04* (2013.01); *H04L 51/26* (2013.01)

(58) Field of Classification Search
USPC ........................................................ 709/206
See application file for complete search history.

(56) References Cited

U.S. PATENT DOCUMENTS

| | | |
|---|---|---|
| 6,721,652 B1 | 4/2004 | Sanqunetti |
| 6,983,202 B2 | 1/2006 | Sanqunetti |
| 7,068,189 B2 | 6/2006 | Brescia |
| 7,272,662 B2 | 9/2007 | Chesnais |
| 7,493,211 B2 | 2/2009 | Breen |
| 7,848,765 B2 | 12/2010 | Phillips |
| 8,024,367 B2 * | 9/2011 | Heinzel ................ G06Q 10/107 707/802 |
| 8,516,116 B2 | 8/2013 | Pollack |
| 8,924,497 B2 | 12/2014 | Sheridan |
| 9,002,949 B2 | 4/2015 | Appleman |
| 9,571,439 B2 | 2/2017 | Appleman |
| 2001/0031633 A1 | 10/2001 | Tuomela |

(Continued)

OTHER PUBLICATIONS

Android Security—Encryption, Android Open Source Project, Aug. 6, 2018.

(Continued)

*Primary Examiner* — Anthony Mejia
(74) *Attorney, Agent, or Firm* — Lieberman & Brandsdorfer, LLC

(57) ABSTRACT

Embodiments relate to a system, program product, and method for use with a computer platform to process and physically convey a notification to a physical medium. In response to receipt, a notification is processed against a hierarchical arrangement of categories. The notification is processed in real-time, including translation of the notification with respect to a tier in the hierarchy. A delivery mechanism and associated instruction is dynamically determined, which includes adaptively assigning the translated notification together with a delivery instruction to a destination device. A physical medium and associated physical device are identified, and the notification is physically conveyed to the physical device across the physical medium.

20 Claims, 7 Drawing Sheets

(56) References Cited

U.S. PATENT DOCUMENTS

| | | | |
|---|---|---|---|
| 2002/0054117 A1* | 5/2002 | van Dantzich | G06Q 10/107 715/766 |
| 2002/0087649 A1* | 7/2002 | Horvitz | G06Q 10/107 709/207 |
| 2002/0198946 A1* | 12/2002 | Wang | H04L 51/04 709/206 |
| 2004/0030753 A1* | 2/2004 | Horvitz | H04W 4/02 709/206 |
| 2004/0154022 A1 | 8/2004 | Boss | |
| 2004/0181604 A1* | 9/2004 | Immonen | G06F 16/9535 709/232 |
| 2004/0254998 A1 | 12/2004 | Horvitz | |
| 2004/0268265 A1 | 12/2004 | Berger | |
| 2007/0105533 A1 | 5/2007 | Chiu | |
| 2008/0032703 A1* | 2/2008 | Krumm | H04W 4/029 455/456.1 |
| 2008/0301580 A1 | 12/2008 | Hjelmeland Almås Randi-Lise | |
| 2009/0281872 A1* | 11/2009 | Kalaboukis | G06Q 30/0256 705/14.54 |
| 2010/0127919 A1 | 5/2010 | Curran | |
| 2011/0063138 A1 | 3/2011 | Berkobin | |
| 2012/0115512 A1 | 5/2012 | Grainger | |
| 2012/0172027 A1 | 7/2012 | Partheesh | |
| 2012/0323933 A1* | 12/2012 | He | H04L 51/24 707/749 |
| 2013/0331087 A1 | 12/2013 | Shoemaker | |
| 2014/0189030 A1* | 7/2014 | Benchenaa | H04L 51/24 709/207 |
| 2016/0127304 A1* | 5/2016 | Reilly | H04L 67/32 709/206 |
| 2016/0248865 A1* | 8/2016 | Dotan-Cohen | H04L 67/26 |
| 2016/0253415 A1* | 9/2016 | Zhong | G06F 16/24565 707/722 |
| 2018/0012463 A1* | 1/2018 | Chaudhry | H04N 7/181 |
| 2018/0082384 A1* | 3/2018 | Karroum | H04W 4/025 |
| 2018/0357386 A1* | 12/2018 | Sanjay-Gopal | G16H 10/60 |
| 2020/0175449 A1* | 6/2020 | Lehmann | H04L 63/0807 |

OTHER PUBLICATIONS

Apple, iOS Security, iOS 11.4, Aug. 2018.

Campigotto, Paolo et al., "Personalized and Situation-Aware Multimodal Route Recommendations: The FAVOUR Algorithm," IEEE Transactions on Intelligent Transportation Systems, Year: 2017, vol. 18, Issue: 1, pp. 92-102.

Garzon, Sandro R., et al., Reliable Geofencing: Assisted Configuration of Proactive Location-Based Services, 2016, IEEE International Conference on Mobile Services, pp. 204-207.

Samsonov, Pavel A., Connecting the Dots: Informing Location-Based Services of Space Usage Rules, 2017, pp. 293-294.

* cited by examiner

INTELLIGENT NOTIFICATION ROUTING AND DELIVERY

BACKGROUND

The present embodiments relate to notifications and delivery of the notifications to a destination device. More specifically, the embodiments relates to a platform to incorporate one or more physical factors together with a feedback portal to provide real-time notification assessment and delivery.

In an interconnected environment, electronic communication notification takes place through several venues and in different formats. The electronic notification may be in the form of a text based message, an instant message, and electronic mail communication. Regardless of the form of the message, it is understood that receipt and review of the message is distracting to the recipient. More specifically, it is understood that the recipient of the message may be involved in a specific task when the message is received, and reviewing the message will distract the recipient from the task.

SUMMARY

The embodiments include a system, computer program product, and method for facilitating notification processing and delivery.

In one aspect, a system is provided with an intelligent computer platform for managing electronic notifications and physical conveyance and implementation of the notification. A processing unit is operatively coupled to memory. A knowledge engine, in communication with the processing unit, is employed to facilitate notification routing and to implement delivery of the notification. The knowledge engine utilizes tools in the form of a notification manager and a delivery manager. The notification manager receives and processes the notification against a hierarchical structure of categories, with the processing including a translation of the notification, and performs a real-time translation of the notification. The delivery manager dynamically determines a delivery mechanism and associated delivery instruction. Furthermore, the delivery manager adaptively assigns a routing to the notification together with the delivery instruction to a destination device. A manifestation of the notification is physically conveyed to a physical medium by the delivery manager.

In another aspect, a computer program device is provided to support electronic notification management and transmission. The device has program code embodied therewith. The program code is executable by a processing unit to process a received notification. More specifically, a corpus is provided with a plurality of categories organized into a hierarchical representation. The program code processes the received notification against the hierarchy. In real-time, program code translates the processes notification into a primary category and a secondary category represented in the hierarchy. Program code is further provided to dynamically determine a delivery mechanism and associated delivery instruction in response to the notification translation. A manifestation of the notification is physically conveyed to a physical medium in response to the dynamic assessment.

In yet another aspect, a method is provided for use by an intelligent computer platform for supporting notification processing and delivery. The method receives and processes a notification. More specifically, the received notification is processed against a hierarchy of categories. In real-time, the processed notification is translated into a primary category and at least one secondary category represented in the hierarchy. A delivery mechanism for the instruction is dynamically assessed and determined, together with a delivery instruction. The notification together with the delivery instruction is adaptively assigned a routing to a destination device. The adaptive routing includes physically conveying a manifestation of the notification to a physical medium.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Techniques described herein are directed to delivering an electronic communication to an intended recipient, and more specifically to a destination device associated with or assigned to the intended recipient. It is understood and recognized that message recipients may prioritize or want to prioritize receipt of messages. The prioritization may be static or dynamic. For example, the recipient may have personal and work related messages, with prioritization subject to change based on time, e.g. work hours and non-work hours. Similarly, with respect to work, the recipient may categorize messages based on the sender and their work related position, and with respect to personal, the recipient may categorize messages based on an associated personal relationship, e.g. friend or family. In addition to the message characteristics, an associated delivery medium may be integrated with the notification routing.

It is understood that different portals and associated physical mediums have different accessibility protocols. For example, a desktop computer is a limited venue for conveying notifications due to the fixed or stationary characteristics of the associated machine. Whereas, a tablet or a mobile telecommunication device has greater accessibility due to its portable characteristics. Accordingly, consideration of the communication portal and associated physical medium is a factor that is integrated with the notification routing.

Figure 1:
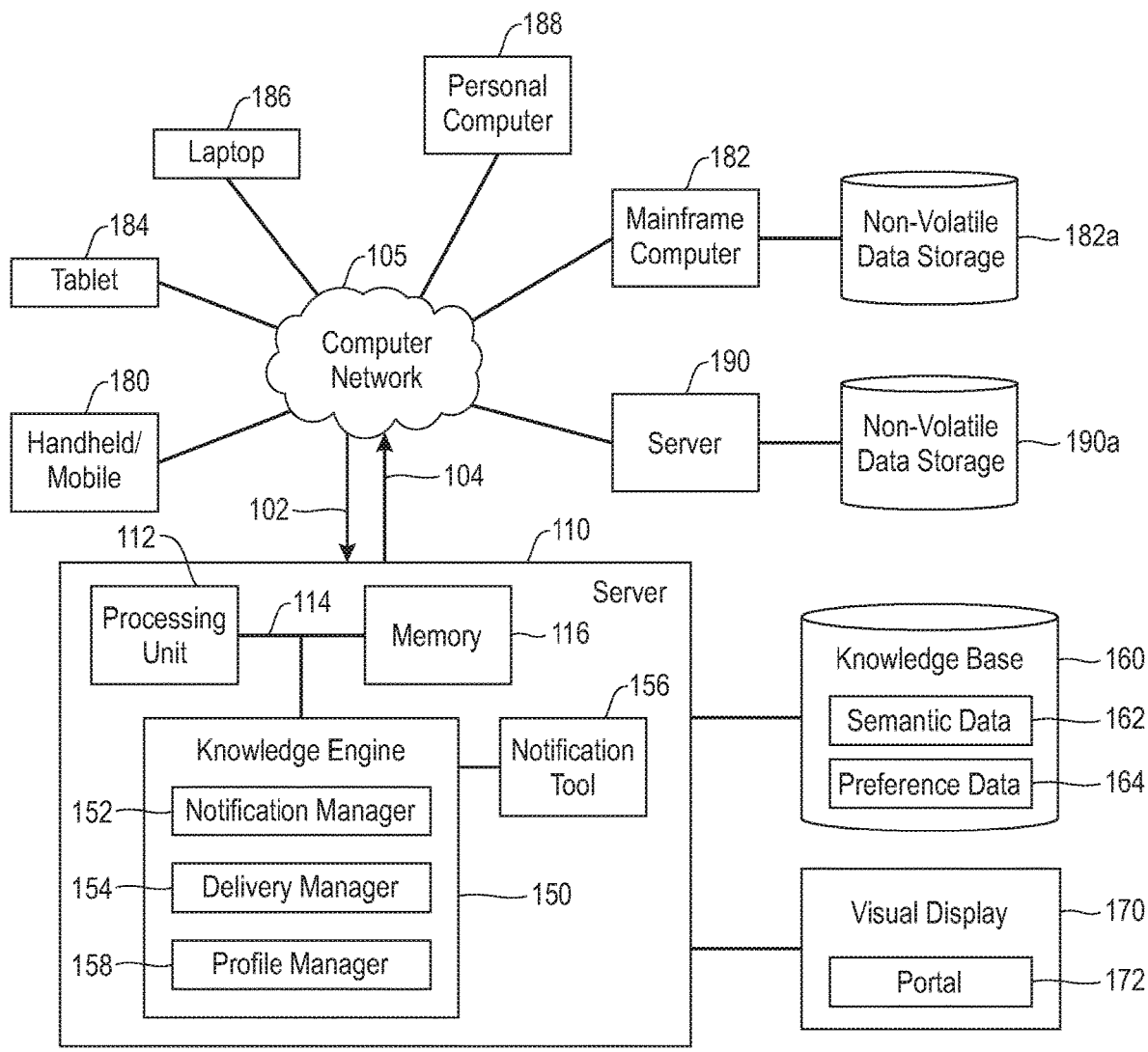
FIG. 1 depicts a system diagram illustrating a content and response system connected in a network environment that uses a knowledge engine to identify and analyze notifications.

Referring to FIG. 1, a schematic diagram of a computer system and associated components (100) for processing and conveying notifications is depicted. As shown, a server (110) is provided in communication with a plurality of computing devices (180), (182), (184), (186), and (188) across a network connection (105). The server (110) is configured with a processing unit (112) in communication with memory (116) across a bus (114). The server (110) is shown with a knowledge engine (150) operatively coupled to the processing unit (112), and configured for notification processing and modeling. As shown, the knowledge engine (150) is configured with a plurality of tools, shown and described herein as a notification manager (152) and a delivery manager (154). Although only two tools are shown and described, the quantity of tools and their associated titles should not be considered limiting. One or more computing devices (180), (182), (184), (186) and (188) are also shown operatively coupled to the network (105). In one embodiment, one or more of the computing devices (180)-(188) may be locally coupled to the server (110). Similarly, in one embodiment, the server (110) may be a shared remote processing device accessible across the network (105). The computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable notification processing and modeling for one or more content users. Other embodiments of the server (110) may be used with components, systems, sub-systems, and/or devices other than those that are depicted herein.

The knowledge engine (150) is configured to receive input from various sources. For example, knowledge engine (150) may receive input from the network (105), one or more knowledge bases of corpus (160) of semantic data (162), or other data, content users, and other possible sources of input. In selected embodiments, the knowledge base (160) also referred to herein as corpus, may include structured, semi-structured, and/or unstructured content that is contained in one or more large knowledge databases or corpus. An example of the semantic data (162) in a structure or semi-structured context is shown and described in FIG. 2. The various computing devices (180), (182), (184), (186), and (188) in communication with the network (105) may include access points for content creators and content users. Some of the computing devices may include devices for a database storing the corpus of data as the body of information used by the knowledge engine (150) to generate and/or transmit a manifestation of the notification across communication channels (102) and (104). The network (105) may include local network connections and remote connections in various embodiments, such that the knowledge engine (150) may operate in environments of any size, including local and global, e.g. the Internet. Additionally, the knowledge engine (150) serves as a front-end system, or in one embodiment a back-end system that can make available a variety of knowledge extracted from or represented in documents, network accessible sources and/or structured data sources. In this manner, some processes populate the knowledge engine (150) with the semantic data (162) also including input interfaces to receive requests and respond accordingly.

As shown, content may be in the form of semantic data (162) for use as part of the corpus (160) of data with the knowledge engine (150). The corpus (160) may include any structured or unstructured documents, including but not limited to any file, text, article, or source of data (e.g. scholarly articles, dictionary, definitions, encyclopedia references, and the like) for use by the knowledge engine (150). Content users may access the knowledge engine (150) via a network connection or an internet connection to the network (105), and may submit data to the knowledge engine (150) that may effectively determine an outcome of a notification by searching content in the corpus of data. As further described below, when a process evaluates semantic content related to input, the process can use a variety of conventions to query content from the knowledge engine (150). The semantic content may also interpret an expression, such as by using Natural Language (NL) processing. In one embodiment, the process sends content across an input communication channel (102) to the knowledge engine (150), so that the content may be interpreted and the knowledge engine (150) may provide a response in the form of one or more outcomes across the outcome communication channel (104).

In some illustrative embodiments, server (110) may be the IBM-Watson® system available from International Business Machines Corporation of Armonk, N.Y., which is augmented with the mechanisms of the illustrative embodiments described hereafter. The Watson™ knowledge manager system may receive input content (102), which is parsed to extract the major features of the content that in turn are then applied to the corpus of data stored in the knowledge base (160). Based on application of the content to the corpus of data, a candidate model and expected behavior is generated by looking across the corpus of data for portions of the corpus of data that have potential for containing a matching outcome to the submitted content.

In particular, received content may be processed by the IBM-Watson® server (110) which performs analysis on the received input content being modeled with respect to the corpus of data found during application of the content using a variety of reasoning algorithms. There may be multiple reasoning algorithms applied, each of which performs different analysis, e.g., comparisons. For example, one or more reasoning algorithms may consult the semantic data (162) and process and evaluate a notification with respect to a hierarchy of categories and in view of input content and in one embodiment physical hardware content. Other reasoning algorithms may look at temporal or spatial features, while others may evaluate the source of the portion of the corpus of data and evaluate its veracity.

To process a notification, and more specifically a translation of the notification as related to delivery, the knowledge engine (150) includes tools in the form of a notification manager (152) and a delivery manager (154). The notification manager (152) receives and processes a notification, and through a notification processing hierarchy (162), conducts a translation of the notification. As shown herein and described in FIG. 2, the notification modeling tool (162) is a hierarchy or hierarchical structure against which the notification is processed. In one embodiment, the notification processing hierarchy (162) may be embodied as a notification tool (156) operatively coupled to the processing unit (112), e.g. hardware processor. The notification manager (152) translates a received notification against the hierarchical structure (162) and translates the notification to one of at least one category, and in one embodiment a sub-category, within the hierarchy. In an embodiment, one or more secondary factors may be leveraged by the notification tool (156) and employed by the notification manager (152) in the notification translation. It is understood that a physical device that initiated the notification and notification processing may be embodied with hardware tools that gather real-time data directed to the associated device and may be employed as secondary characteristics of the notification. Such tools include, but are not limited to, location services, map services, global positioning data, accelerometer, and preference settings. Accordingly, the notification together with device data, e.g. secondary characteristics, is processed by the notification manager (152) for translation of the notification to a category and/or a sub-category within the hierarchy.

The notification processing conducted by the notification manager (152), and in one embodiment the associated notification tool (156), conducts a real-time translation of the notification into a primary category, and in one embodiment a secondary category. It is understood that in addition to the hierarchy and associated notification processing, the sender or intended recipient of the notification may have associated preference data (164), including but not limited to physical device state data. For example, in one embodiment, the preference data may be directed at a device medium for transmission of the notification that is separately defined from the hierarchy of categories. In one embodiment, each device and/or recipient that is a party to the notification has an associated identifier and preference data assigned to the identifier. The notification manager (152) models the received notification with respect to the structured hierarchy (162) and in one embodiment, the preference data (164). Accordingly, the notification manager (152) functions to process the received notification with respect to a plurality of factors, including, but not limited to, the hierarchy (162) and the preference data (164).

As shown, the delivery manager (154) is operatively coupled to the notification manager (152) and functions to dynamically assess the processed and translated notification and to adaptively assign a routing and delivery instruction to the notification. In one embodiment, the delivery manager determines a delivery method and timing for delivery of the notification to a destination device. The assignment conducted by the delivery manager (154) includes delivery of the processed notification to the designated or assigned destination device. It is understood that part of the notification processing may include selection or designation of the device, which in one embodiment, may be one of the devices (180)-(188), or in one embodiment any device operatively coupled to the network (105). The notification delivery may take place in real-time, or in one embodiment, may be subject to a delay for a variety of reasons. For example, in one embodiment the notification may have an undeliverable classification, in which case the delivery manager places the processed notification in a queue for a delayed delivery.

It is understood that both the hierarchy (162) and the preference data (164) are dynamic and subject to change, with any changes to the hierarchy (162) and/or the preference data (164) may affect the notification translation and any associated determination and/or determination characteristics. For example, in one embodiment, the delivery manager (154) leverages device specific data attained from the embedded hardware tools, e.g. location services, map services, global positioning data, accelerometer, and preference settings, in real-time. Similarly, data associated with the notification processing may be incorporated into the hierarchy. A profile manager (158) is shown herein operatively coupled to the notification manager (152) and the processing unit (112). The profile manager (158) functions as a tool to facilitate the dynamic nature of the structural data (162) that supports the notification processing. More specifically, the profile manager (158) interfaces with the structural data (162) to adaptively modify the hierarchy, such as amending a category or sub-category, or in one embodiment creating a new category or sub-category. In one embodiment, the profile manager (158) looks at patterns within the notification processing, classifies the notification with respect to the hierarchy, and adaptively amends the structural data (162) responsive to the notification processing.

The dynamic feedback mechanism is employed with respect to notification delivery. The delivery manager (154) assesses the notification for delivery determination, and the profile manager (158) invokes feedback protocols responsive to the delivery determination. It is understood that as messages are transmitted and received, any actions associated with the messages may be converted to inherent feedback data. At the same time, any explicit feedback directed at the notification may be gathered as expressed feedback data. Both express and inherent feedback data is collected and processed by the profile manager (158). In one embodiment, the profile manager (158) assesses the feedback data in view of the structural data (162). Any modifications to the structural data (162) are utilized by the notification manager (152) and incorporated into dynamic notification routing invoked by the delivery manager (154). Accordingly, as notifications are processed and/or transmitted, associated data is attained to support and enable dynamic notification assignment and routing.

As shown, a visual display (170) is operatively coupled to the server (110). A feedback portal (172) is shown on the visual display (172). The portal (172) is operatively coupled to the knowledge engine (150). The portal (172) functions as an interface or venue to receive modification data directed at a characteristic of the delivery notification. In one embodiment, a subject of the notification may access the portal and amend routing instructions, the feedback data, and/or the hierarchy (162). In one embodiment, the profile manager (158) leverages data within the portal, and more specifically any amended data, and dynamically modifies an associated delivery instructions in response to relevant characteristic data identified within the portal (172). Accordingly, the profile manager (158) leverages both data within the portal and feedback data in the dynamic notification assessment.

Though shown as being embodied in or integrated with the server (110), the information handling system in the form of the knowledge engine (150), the managers (152), (154), and (158), and/or the notification tool (156) may be implemented in a separate computing system (e.g., 190) that is connected across network (105) to the server (110). Wherever embodied, the knowledge engine (150) detects and processes the notification, including categorization with respect to dynamic and static data, and delivery of the notification to a select physical medium and associated physical device response to the categorization. In one embodiment, the data analysis conducted by the profile manager (158) includes metadata discovery and evaluation, and application of the metadata to the notification processing.

Types of devices that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, pen, or tablet, computer (184), laptop, or notebook, computer (186), personal computer system (188), and server (190). Input devices (not shown) may be locally couples to one or more of the devices (180)-(188), or coupled to the network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the devices utilize data and data storage devices, such as nonvolatile data stores, such as hard drives and/or nonvolatile memory. Some of the devices may use separate nonvolatile data stores (e.g., server (190) utilizes nonvolatile data store (190a), and mainframe computer (182) utilizes nonvolatile data store (182a)). The nonvolatile data store (182a) can be a component that is external to the various information handling systems or can be internal to one of the information handling systems.

Figure 2:
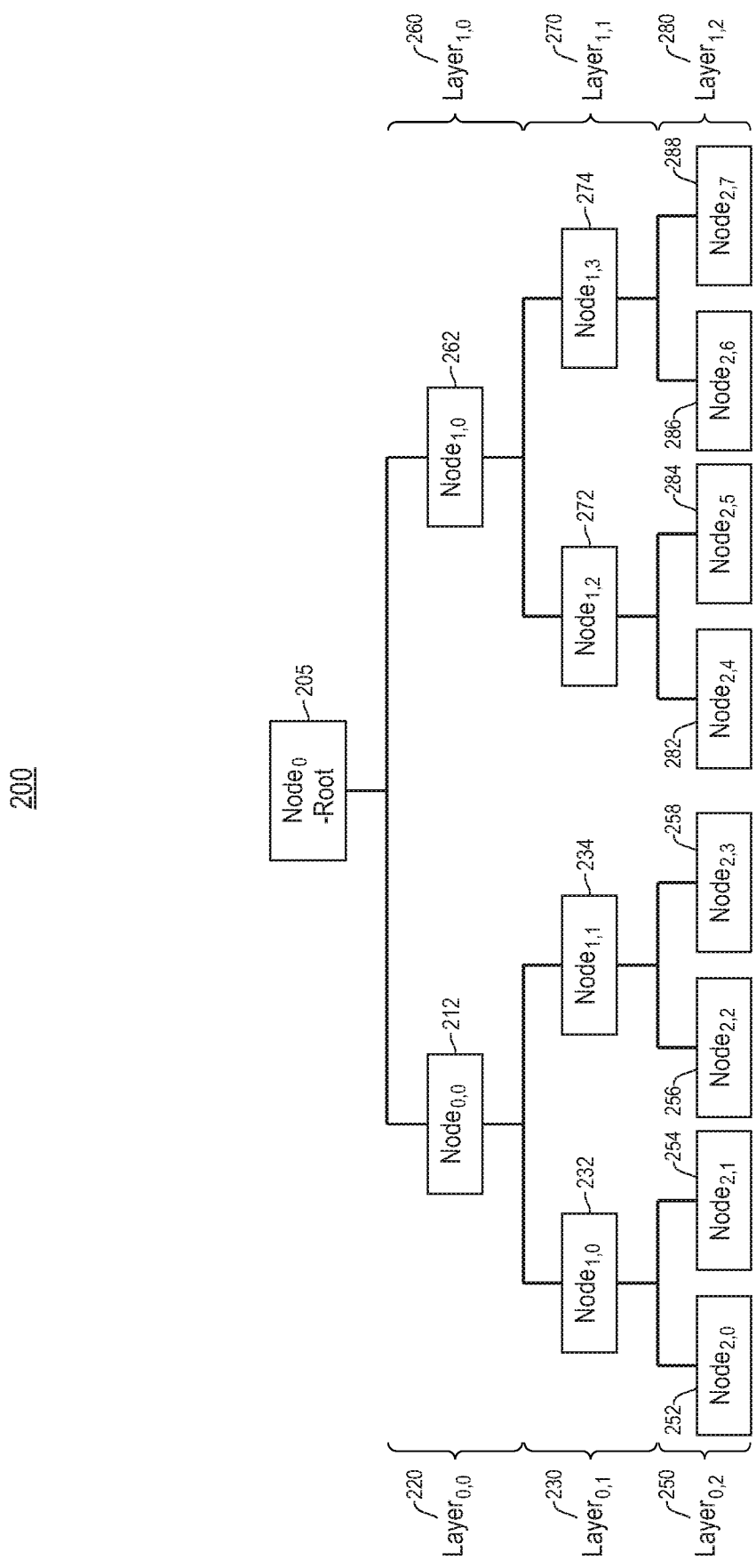
FIG. 2 depicts a block diagram illustrating a schematic representation of a hierarchical structure for processing a notification.

Referring to FIG. 2, a block diagram (200) is provided illustrating a schematic representation of a hierarchical structure for processing a notification. As shown and described in the example, the hierarchy is an inverted tree structure in which a plurality of items are grouped in the layering. As shown in this example, the hierarchy is shown with a root node (205) and two groupings, referred to herein as a first grouping and a second grouping, $group_0$ and $group_1$ respectively. Each of the groupings is shown with multiple layers, e.g. three layers, although the quantity of layers should not be considered limiting. More specifically, the first grouping, $group_0$ is shown with $layer_{0,0}$ (220), $layer_{0,1}$ (230), and $layer_{0,2}$ (250), and the second grouping, $group_1$, is shown with $layer_{1,0}$ (260), $layer_{1,1}$ (270), and $layer_{1,2}$ (280). Each layer within each grouping may have one or more items, referred to herein as nodes. As shown in this example, $layer_{0,0}$ (220) and $layer_{1,0}$ (260) are each shown with one item, including $node_{0,0}$ (212) and $node_{1,0}$ (262), respectively. $Layer_{0,1}$ (230) and $layer_{1,1}$ (270) are each shown with two nodes, including $node_{1,0}$ (232) and $node_{1,1}$ (234) in $layer_{0,1}$ (230) and $node_{1,2}$ (272) and $node_{1,3}$ (274) in $layer_{1,1}$ (270). $Layer_{0,2}$ (250) and $layer_{1,2}$ (280) are each shown with four nodes, including $node_{2,0}$ (252), $node_{2,1}$ (254), $node_{2,2}$ (256), and $node_{2,3}$ (258) in $layer_{0,2}$ (250), and $node_{2,4}$ (282), $node_{2,5}$ (284), $node_{2,6}$ (286), and $node_{2,7}$ (288) in $layer_{1,2}$ (280). The hierarchy shown and the associated quantity and structure of nodes and associated items represented in the hierarchy is merely an example and should not be considered limiting. The hierarchy (200) is directed at a structure to process and/or classify electronic notifications. As shown and described herein, a priority may be assigned within or responsive to the evaluation of a received notification responsive to the hierarchical structure. By definition and illustration, assignment of a priority to a notification is not equivalent to organizing notification categories into a hierarchy. Similarly, use of the hierarchical structure does not necessitate the assignment of a priority to any notification. Accordingly, the hierarchical structure shown and described is a representation of communication categories against which a notification is processed.

Figure 3:
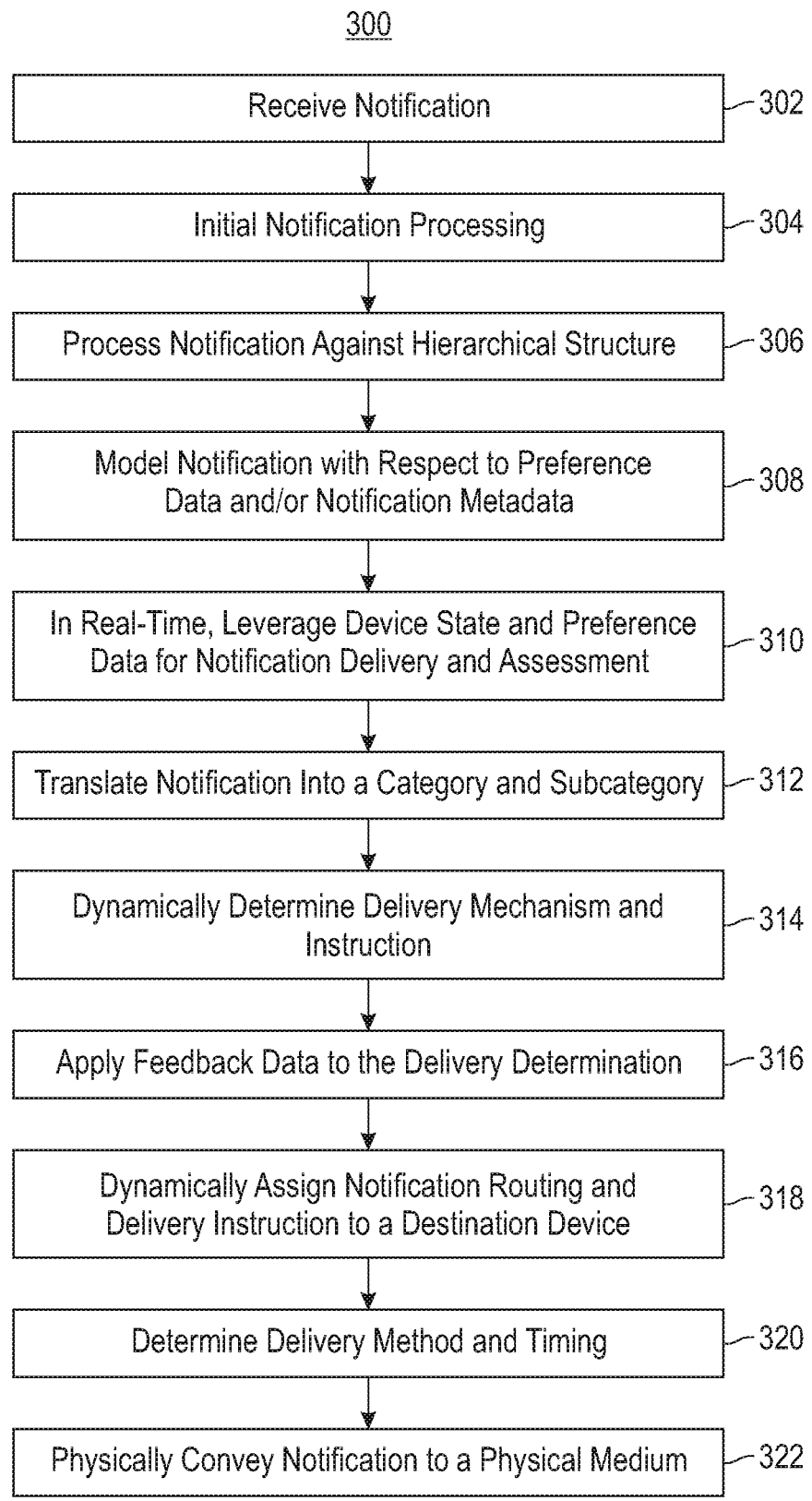
FIG. 3 depicts a flow chart illustrating a process for notification routing assessment and delivery.

To provide additional details for an improved understanding of selected embodiments of the present disclosure, reference is now made to FIG. 3 which includes a flow chart (300) illustrating a process for notification routing assessment and delivery. As shown, a notification is received (302) and the associated processing is initiated. An initial aspect of the notification processing includes, but is not limited to, identification of the parties (304), e.g. sender and receiver. It is understood that each party, or in one embodiment, each device assigned to the parties may have an associated identifier. As shown and described in FIGS. 1 and 2, a hierarchical structure of categories and sub-categories is provided and utilized in the notification processing. In one embodiment, each party and/or each party associated device may have a related hierarchical structure. Similarly, in one embodiment, one party may have multiple devices with each device having a unique identifier. The identifier(s) associated with the notification may be leveraged to locate an associated hierarchical structure.

Once the notification related hierarchy is identified at step (304), the notification is processed against the categories and sub-categories of the structure (306). The processing includes modeling the notification with respect to preference data, and in one embodiment with respect to device and/or notification metadata (308). In addition to modeling, physical device state and preference data are leveraged in real-time to localize notification delivery and assessment (310). Following the modeling process, the notification is translated into at least one primary category and one secondary category represented in the hierarchy (312). It is understood that the categorization of the notification is directly related to the delivery of the notification. As shown, a delivery mechanism and delivery instruction are dynamically determined by the notification translation (314). In one embodiment, a feedback mechanism is invoked following step (314), whereby feedback data is applied to the delivery determination (316). The feedback data may be gathered from a physical device associated with notification routing, or in one embodiment, via a feedback portal. A routing of the notification and the delivery instruction is dynamically assigned to a destination device in response to the determined delivery mechanism (318). In one embodiment, the dynamic notification assignment at step (318) incorporates application of the feedback data from step (316). Following the assignment at step (318) and prior to delivery of the notification, a delivery method and timing of the delivery to a destination device are determined (320), followed by physically conveying a manifestation of the notification to a physical medium (322). It is understood that the notification may transmit in real-time, or in one embodiment may be subject to delay for various reasons, including but not limited to, network bandwidth, device location, etc. In the event the notification is subject to a delayed transmission, the notification is placed in a queue for delivery to the physical medium. In one embodiment, aspects of the delay are incorporated in the feedback metadata and populated into the portal and/or hierarchy.

The notification processing and delivery shown and described in FIG. 3, is a dynamic process. In one embodiment, current state information related to the notification origin and/or destination is part of the metadata that is incorporated into the notification processing and delivery assessment. Evaluation of the hierarchy enables classification of the notification and review of past notification processing in the same or similar category or sub-category. The hierarchy supports and enables learning from the past and incorporating historical notification processing into current notification processing. In one embodiment, the hierarchy may direct the designation of the destination device, e.g. watch in place of mobile phone, or vehicle display in place of mobile phone. Accordingly, notification processing and delivery is a multi-dimensional assessment.

The assessment and routing may be referred to as processes and sub-processes that form an artificial intelligence platform. The aspect of populating the hierarchical structure shown and described in FIG. 2 may be referred to as a learning phase, which also includes building the corpus and creating feedback in real-time. The building of the corpus addresses the artificial intelligence component and enables the data in the corpus to grow and for the system to learn. As the corpus grows with data entries, the artificial intelligence platform learns. At the same time, an entry is created in the corpus with data corresponding to the notification and associated characteristics. An output device is identified and an output signal is communicated to a physical medium and/or a physical output device. The aspect of notification delivery incorporating the learned intelligence correlates to an execution phase in which the data accumulated in the learning phase is applied to notification delivery. The output device is selected via the artificial intelligence platform, or in one embodiment pre-selected. For example, the output device may be initially pre-selected or identified via the notification prior to processing, or subject to change through the notification processing. Accordingly, the corpus is employed to ascertain a corresponding value for the notification, which in one embodiment is translated into a corresponding sensory output value that is correlated with a physical output device.

Aspects of dynamic notification processing shown and described in FIGS. 1-3, employ one or more functional tools to support the learning and execution phases together with the artificial intelligence platform. Aspects of the functional tool(s), e.g. knowledge engine, and its associated functionality may be embodied in a computer system/server in a single location, or in one embodiment, may be configured in a cloud based system sharing computing resources.

Figure 4:
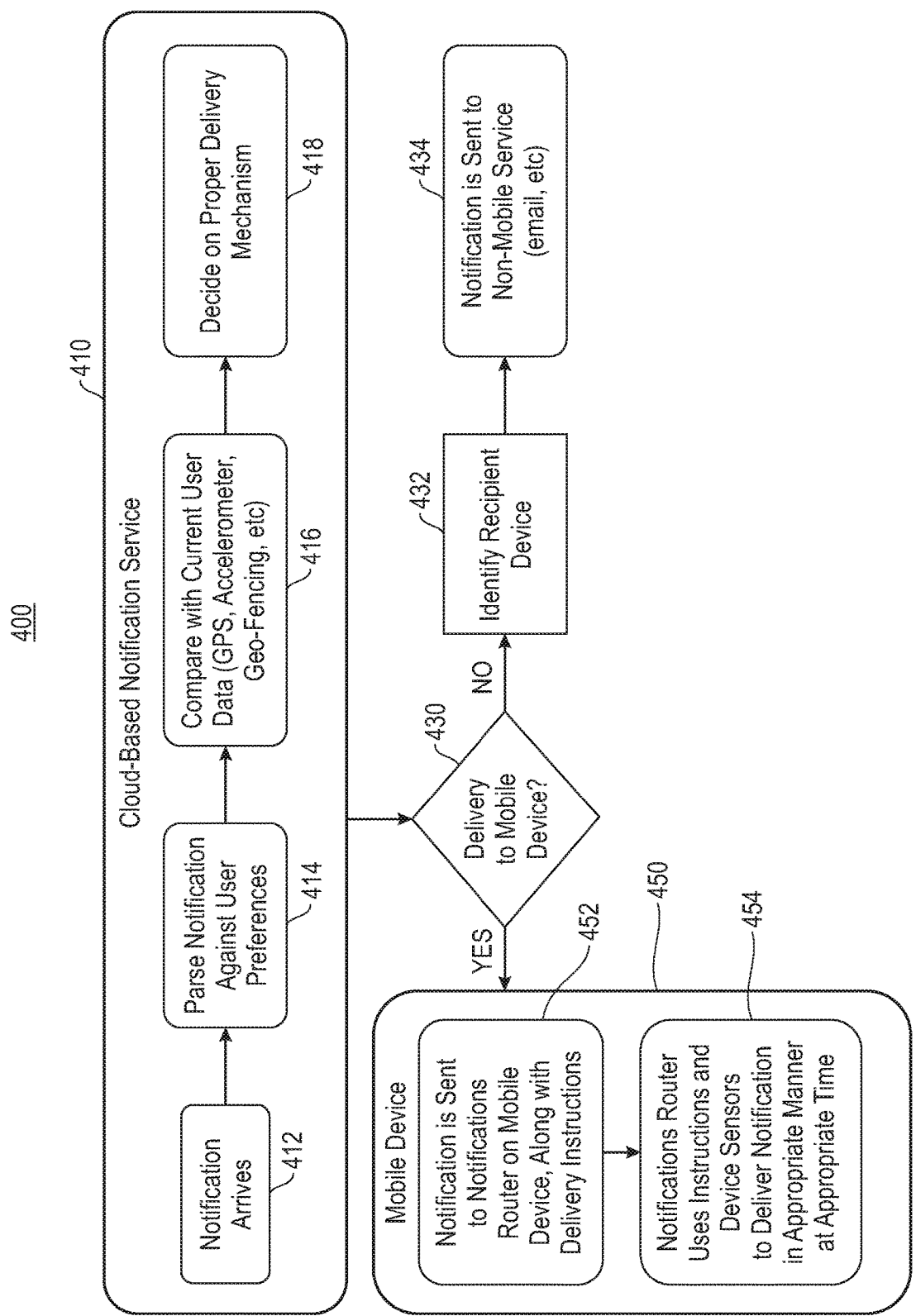
FIG. 4 depicts a flow diagram illustrating a cloud-based implementation of the notification processing shown and described in FIGS. 1-3.

With reference to FIG. 4, a flow diagram (400) is provided illustrating a cloud-based implementation of the notification processing shown and described in FIGS. 1-3. As show, there is a cloud based notification service (410) operatively coupled to a mobile device (450) across a communication network, e.g. (105). A notification is received (412) and parsed against preferences (414). In one embodiment, a hierarchy structure of preferences is identified for the notification, and utilized for the parsing at step (414). An example of the hierarchy structure is shown and described in FIG. 2. In one embodiment, a plurality of hierarchical structures are stored in a corpus, e.g. data storage library, and a hierarchy related to the physical device is identified and selected for the parsing. In addition to the parsing, the notification is processed with respect to one or more physical parameters associated with the physical device that is the subject of the notification (416). Examples of the physical parameters include, but is not limited to, global position data, accelerometer data, geo-fencing, etc. A delivery mechanism for the notification is determined (418) following the processing at step (416). Accordingly, the notification processing shown herein may be remote in a cloud based tool, such as but not limited to, a server or a shared computer resource operatively coupled to the mobile device (450) across a network.

Following the notification processing, it is determined if the determination at step (416) identified the mobile device (450) to be the recipient of the processing notification (430). A negative response to the determination at step (430) is followed by identifying the recipient device (432), and transmitting the notification to the identified recipient device (434). In one embodiment, the recipient device may be a non-mobile service, such as desktop computer or a tablet computer configured to receive the notification. Similarly, in one embodiment, the non-mobile device receives the notification in a different medium, e.g. electronic mail, in place of a texting medium. However, a positive response to the determination at step (430) is following by a notification router, e.g. knowledge engine (150), local to the mobile device receiving the notification together with notification delivery instructions (452). The notification router uses the instructions and in one embodiment one or more device sensors to deliver the notification in an appropriate manner and time (454). In one embodiment, the notification router dictates the notification delivery manner and time. Similarly, in one embodiment, the cloud-based notification service (410) dictates the notification delivery manner and time, and the notification router implements associated instructions received with the notification. Accordingly, the notification evaluation and processing may be implemented as a cloud based resource.

With references to FIG. 5, a block diagram (500) is provided illustrating an example of a computer system/server (502), hereinafter referred to as a host (502) in communication with a cloud based support system, to implement the processes described above with respect to FIGS. 1-3. Host (502) is operational with numerous other general purpose or special purpose computing system environments or configurations. Examples of well-known computing systems, environments, and/or configurations that may be suitable for use with host (502) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (502) may be described in the general context of computer system-executable instructions, such as program modules, being executed by a computer system. Generally, program modules may include routines, programs, objects, components, logic, data structures, and so on that perform particular tasks or implement particular abstract data types. Host (502) may be practiced in distributed cloud computing environments where tasks are performed by remote processing devices that are linked through a communications network. In a distributed cloud computing environment, program modules may be located in both local and remote computer system storage media including memory storage devices.

Figure 5:
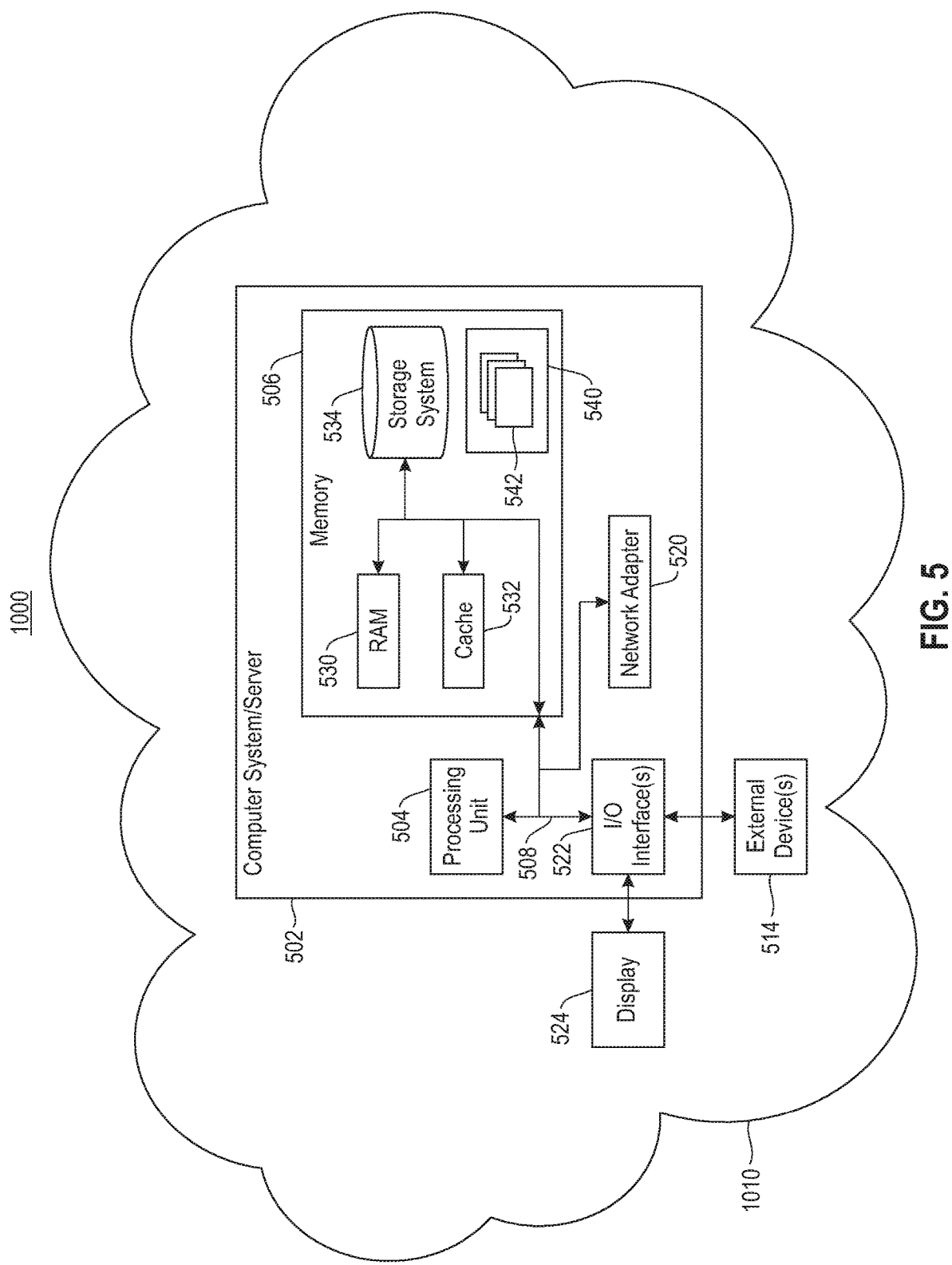
FIG. 5 is a block diagram illustrating an example of a computer system/server of a cloud based support system, to implement the process described above with respect to FIGS. 1-4.

As shown in FIG. 5, host (502) is shown in the form of a general-purpose computing device. The components of host (502) may include, but are not limited to, one or more processors or processing units (504), a system memory (506), and a bus (508) that couples various system components including system memory (506) to processor (504). Bus (508) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (502) typically includes a variety of computer system readable media. Such media may be any available media that is accessible by host (502) and it includes both volatile and non-volatile media, removable and non-removable media.

Memory (506) can include computer system readable media in the form of volatile memory, such as random access memory (RAM) (530) and/or cache memory (532). By way of example only, storage system (534) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (508) by one or more data media interfaces.

Program/utility (540), having a set (at least one) of program modules (542), may be stored in memory (506) by way of example, and not limitation, as well as an operating system, one or more application programs, other program modules, and program data. Each of the operating systems, one or more application programs, other program modules, and program data or some combination thereof, may include an implementation of a networking environment. Program modules (542) generally carry out the functions and/or methodologies of embodiments to data modeling directed at notification processing and output directed at delivery execution. For example, the set of program modules (542) may include the modules configured as the knowledge engine, notification manager, delivery manager, and profile manager as described in FIG. 1.

Host (502) may also communicate with one or more external devices (514), such as a keyboard, a pointing device, a sensory input device, a sensory output device, etc.; a display (524); one or more devices that enable a user to interact with host (502); and/or any devices (e.g., network card, modem, etc.) that enable host (502) to communicate with one or more other computing devices. Such communication can occur via Input/Output (I/O) interface(s) (522). Still yet, host (502) can communicate with one or more networks such as a local area network (LAN), a general wide area network (WAN), and/or a public network (e.g., the Internet) via network adapter (520). As depicted, network adapter (520) communicates with the other components of host (502) via bus (508). In one embodiment, a plurality of nodes of a distributed file system (not shown) is in communication with the host (502) via the I/O interface (522) or via the network adapter (520). It should be understood that although not shown, other hardware and/or software components could be used in conjunction with host (502). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (506), including RAM (530), cache (532), and storage system (534), such as a removable storage drive and a hard disk installed in a hard disk drive.

Computer programs (also called computer control logic) are stored in memory (506). Computer programs may also be received via a communication interface, such as network adapter (520). Such computer programs, when run, enable the computer system to perform the features of the present embodiments as discussed herein. In particular, the computer programs, when run, enable the processing unit (504) to perform the features of the computer system. Accordingly, such computer programs represent controllers of the computer system.

In one embodiment, host (502) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
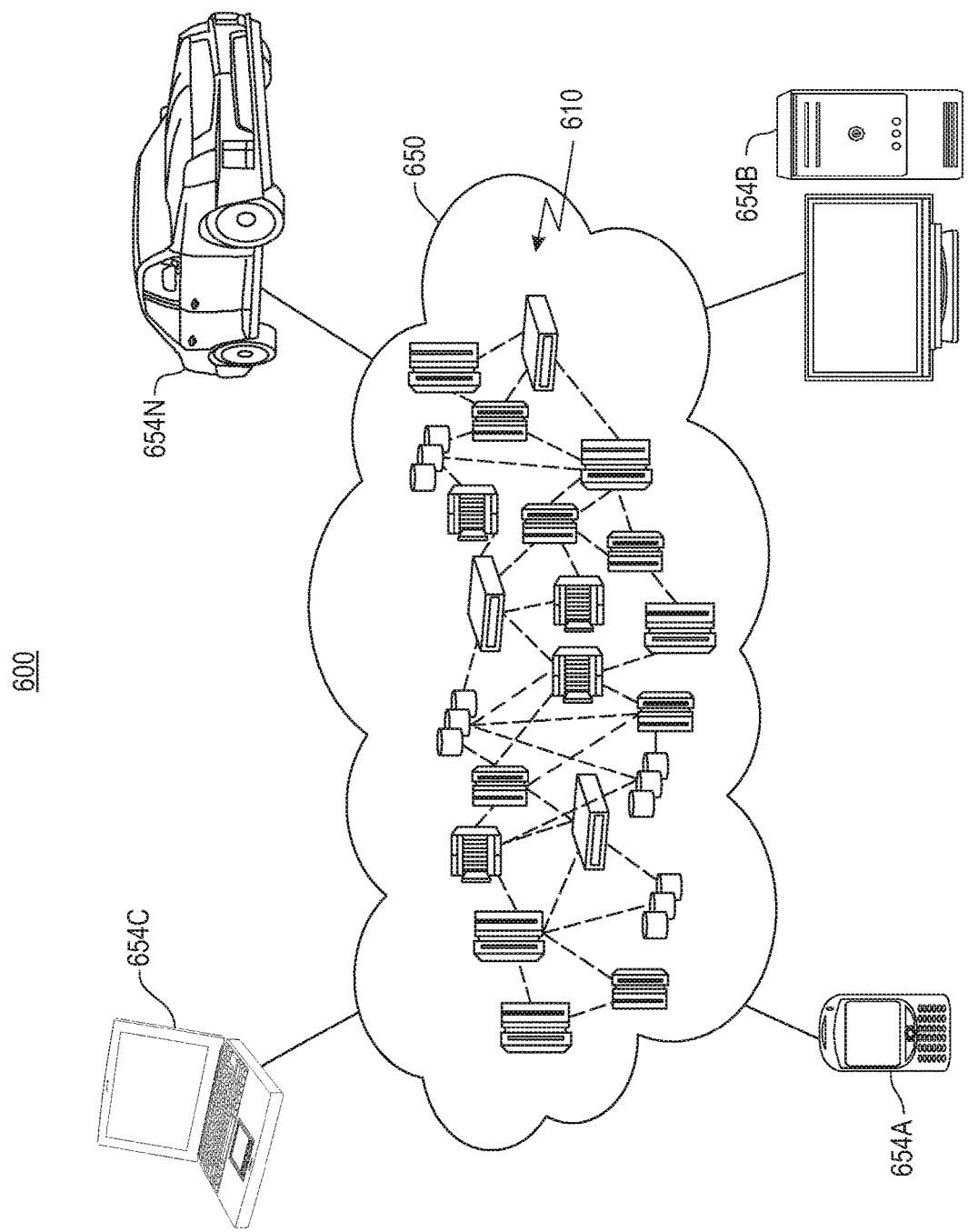
FIG. 6 depicts a block diagram illustrating a cloud computer environment.

Referring now to FIG. 6, an illustrative cloud computing network (600). As shown, cloud computing network (600) includes a cloud computing environment (650) having one or more cloud computing nodes (610) with which local computing devices used by cloud consumers may communicate. Examples of these local computing devices include, but are not limited to, personal digital assistant (PDA) or cellular telephone (654A), desktop computer (654B), laptop computer (654C), and/or automobile computer system (654N). Individual nodes within nodes (610) may further communicate with one another. They may be grouped (not shown) physically or virtually, in one or more networks, such as Private, Community, Public, or Hybrid clouds as described hereinabove, or a combination thereof. This allows cloud computing environment (600) to offer infrastructure, platforms and/or software as services for which a cloud consumer does not need to maintain resources on a local computing device. It is understood that the types of computing devices (655A-N) shown in FIG. 6 are intended to be illustrative only and that the cloud computing environment (650) can communicate with any type of computerized device over any type of network and/or network addressable connection (e.g., using a web browser).

Figure 7:
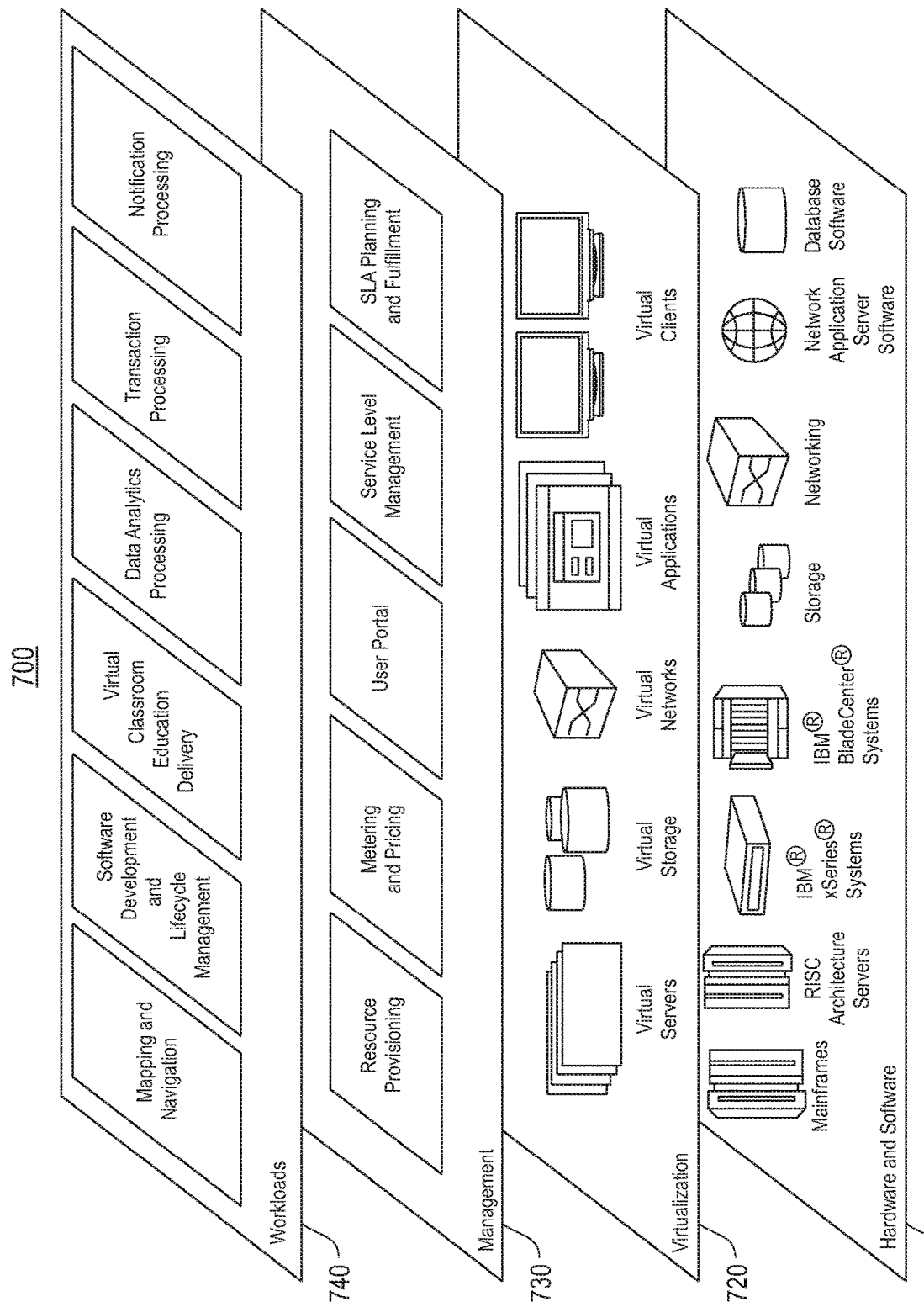
FIG. 7 depicts a block diagram illustrating a set of functional abstraction model layers provided by the cloud computing environment.

Referring now to FIG. 7, a set of functional abstraction layers (700) provided by the cloud computing network of FIG. 6 is shown. It should be understood in advance that the components, layers, and functions shown in FIG. 7 are intended to be illustrative only, and the embodiments are not limited thereto. As depicted, the following layers and corresponding functions are provided: hardware and software layer (710), virtualization layer (720), management layer (730), and workload layer (740). The hardware and software layer (710) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (720) provides an abstraction layer from which the following examples of virtual entities may be provided: virtual servers; virtual storage; virtual networks, including virtual private networks; virtual applications and operating systems; and virtual clients.

In one example, management layer (730) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (740) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and notification processing.

It will be appreciated that there is disclosed herein a system, method, apparatus, and computer program product for evaluating and processing sensory input, modeling the input, translating the input into a force, and ascertaining and communicating a sensory output. As disclosed, the system, method, apparatus, and computer program product apply artificial intelligence processing to the sensory input to contribute to identification of a corresponding sensory output.

While particular embodiments of the present embodiments have been shown and described, it will be obvious to those skilled in the art that, based upon the teachings herein, changes and modifications may be made without departing from these embodiments and their broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product are operative to improve the functionality and operation of notification processing and delivery.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the artificial intelligence platform and associated processing may be carried out by different computing platforms or across multiple devices. Furthermore, the data storage and/or corpus may be localized, remote, or spread across multiple systems. Accordingly, the scope of protection of these embodiments is limited only by the following claims and their equivalents.

What is claimed is:

1. A system comprising:
a processing unit operatively coupled to memory; and
a knowledge engine in communication with the processing unit, the knowledge engine to facilitate notification routing and delivery, the knowledge engine comprising:
a notification manager to receive and process a notification against a hierarchy of categories, the processing including categorization of the notification with respect to the hierarchy of categories, the categories including a primary category and a secondary category, and in real-time, translate the processed notification into at least one primary category and one secondary category;
a delivery manager to dynamically determine a delivery mechanism and a delivery instruction responsive to the categorization and notification translation, and adaptively assign a routing of the notification together with the delivery instruction to a destination device responsive to the determined delivery mechanism, the categorization with respect to the hierarchy of categories directing, at least in part, designation of the destination device for the routing of the notification; and
the delivery manager to physically convey a manifestation of the notification to a physical medium.

2. The system of claim 1, further comprising the notification manager to model the received notification with respect to preference data, and the delivery manager to leverage physical device state and the preference data in real-time and localize delivery assessment and assignment.

3. The system of claim 1, further comprising a profile manager operatively coupled to the delivery manager, the profile manager to invoke a feedback mechanism responsive to the delivery determination, including application of feedback data to the delivery determination and dynamically assign the notification routing responsive to the applied feedback data.

4. The system of claim 3, further comprising a feedback portal operatively coupled to the physical medium, the portal including a venue to receive a modification of a characteristic of the notification delivery, and further comprising the delivery manager to consult the feedback portal and dynamically modify the delivery instruction responsive to identified characteristic data present in the portal.

5. The system of claim 4, wherein the delivery manager determines a delivery method and timing for delivery of the notification to a destination device.

6. The system of claim 5, further comprising the delivery manager to queue the notification for delivery to the physical medium responsive to an undeliverable classification.

7. A computer program product to facilitate notification routing and delivery, comprising a computer readable storage device having program code embodied therewith, the program code executable by a processing unit to:
process a received notification against a hierarchy of categories, the process including categorization of the notification with respect to the hierarchy of categories, the categories including a primary category and a secondary category;
in real-time, translate the processed notification into at least one primary category and one secondary category;
dynamically determine a delivery mechanism and a delivery instruction responsive to the categorization and notification translation;
adaptively assigning a routing of the notification together with the delivery instruction to a destination device responsive to the determined delivery mechanism, the categorization with respect to the hierarchy of categories directing, at least in part, designation of the destination device for the routing of the notification; and
physically convey a manifestation of the notification to a physical medium.

8. The computer program product of claim 7, wherein the program code to process the received notification models the received notification with respect to preference data.

9. The computer program product of claim 8, wherein the dynamic delivery mechanism determination includes program code to leverage physical device state and preference data in real-time and localize delivery assessment and assignment.

10. The computer program product of claim 8, further comprising program code to invoke a feedback mechanism responsive to the delivery determination, including application of feedback data to the delivery determination and dynamically assign the notification routing responsive to the applied feedback data.

11. The computer program product of claim 10, further comprising a feedback portal operatively coupled to the physical medium, the portal including a venue to receive a modification of a characteristic of the notification delivery, and further comprising program code to consult the feedback portal and dynamically modify the delivery instruction responsive to identified characteristic data present in the portal.

12. The computer program product of claim 7, wherein the notification determines a delivery method and timing for delivery of the notification to a destination device.

13. The computer program product of claim 12, further comprising program code to queue the notification for delivery to the physical medium responsive to an undeliverable classification.

14. A method comprising:
receiving a notification;
processing the received notification against a hierarchy of categories, the processing including categorization of the notification with respect to the hierarchy of categories, the categories including a primary category and a secondary category;
in real-time, translating the processed notification into at least one primary category and one secondary category in the hierarchy;
dynamically determining a delivery mechanism and a delivery instruction responsive to the categorization and notification translation;
adaptively assigning a routing of the notification together with the delivery instruction to a destination device responsive to the determined delivery mechanism, the categorization with respect to the hierarchy of categories directing, at least in part, designation of the destination device for the routing of the notification, wherein the adaptive routing includes physically conveying a manifestation of the notification to a physical medium.

15. The method of claim 14, wherein processing the received notification further comprises modeling the received notification with respect to preference data.

16. The method of claim 14, wherein the dynamic delivery mechanism determination includes leveraging physical device state and preference data in real-time and localizing delivery assessment and assignment.

17. The method of claim 16, further comprising invoking a feedback mechanism responsive to the delivery determination, including applying feedback data to the delivery determination and dynamically assigning the notification routing responsive to the applied feedback data.

18. The method of claim 17, further comprising a feedback portal operatively coupled to the physical medium, the portal including a venue to receive a modification of a characteristic of the notification delivery, and further comprising consulting the feedback portal and dynamically modifying the delivery instruction responsive to identified characteristic data present in the portal.

19. The method of claim 14, wherein the notification determines a delivery method and timing for delivery of the notification to a destination device.

20. The method of claim 19, further comprising queueing the notification for delivery to the physical medium responsive to an undeliverable classification.

* * * * *